(12) United States Patent
Härtel et al.

(10) Patent No.: US 6,773,352 B2
(45) Date of Patent: Aug. 10, 2004

(54) ELASTOMER BEARING

(75) Inventors: Volker Härtel, Hannover (DE); Jürgen Tschimmel, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/884,927

(22) Filed: Jun. 21, 2001

(65) Prior Publication Data
US 2002/0022525 A1 Feb. 21, 2002

(30) Foreign Application Priority Data

Jun. 22, 2000 (DE) .......................................... 100 29 564

(51) Int. Cl.⁷ .............................................. F16D 27/00
(52) U.S. Cl. ........................... 464/29; 464/100; 464/88
(58) Field of Search ............................. 464/29, 88, 92, 464/900, 181, 78; 310/369

(56) References Cited

U.S. PATENT DOCUMENTS

| | | | |
|---|---|---|---|
| 4,624,435 A | 11/1986 | Freudenberg | |
| 4,687,171 A | 8/1987 | Freudenberg | |
| 4,699,346 A | 10/1987 | Bahm | |
| 4,869,474 A | * 9/1989 | Best et al. | ........... 267/136 |
| 4,874,979 A | * 10/1989 | Rapp | ........... 310/328 |
| 5,081,882 A | * 1/1992 | Kogure | ........... 188/290 |
| 5,090,531 A | * 2/1992 | Carlson | ........... 188/267.1 |
| 5,167,582 A | * 12/1992 | Hunt | ........... 464/78 |
| 5,681,032 A | 10/1997 | Hofmann | |
| 5,730,429 A | * 3/1998 | Ivers et al. | ........... 267/140.14 |
| 5,988,336 A | * 11/1999 | Wendt et al. | ........... 188/267.1 |
| 6,119,733 A | * 9/2000 | Arndt et al. | ........... 139/194 |

FOREIGN PATENT DOCUMENTS

| | | |
|---|---|---|
| DE | 1901501 | 8/1969 |
| DE | 3441592 | 5/1986 |
| FR | 1260067 | 5/1961 |

OTHER PUBLICATIONS

European Search Report (in German) dated Jul. 25, 2003 conducted in European Patent Application No. 01 11 4203.

* cited by examiner

Primary Examiner—Lynne H. Browne
Assistant Examiner—Aaron Dunwoody
(74) Attorney, Agent, or Firm—Greenblum & Bernstein, P.L.C.

(57) ABSTRACT

Bearing for damping or decoupling vibrations between adjacent components. The bearing includes a spring body having face ends, a connection part coupled to at least one of the face ends, and a frictional damper coupled in a parallel manner with the spring body. The frictional damper is at least one of electrically and electronically regulatable.

13 Claims, 1 Drawing Sheet

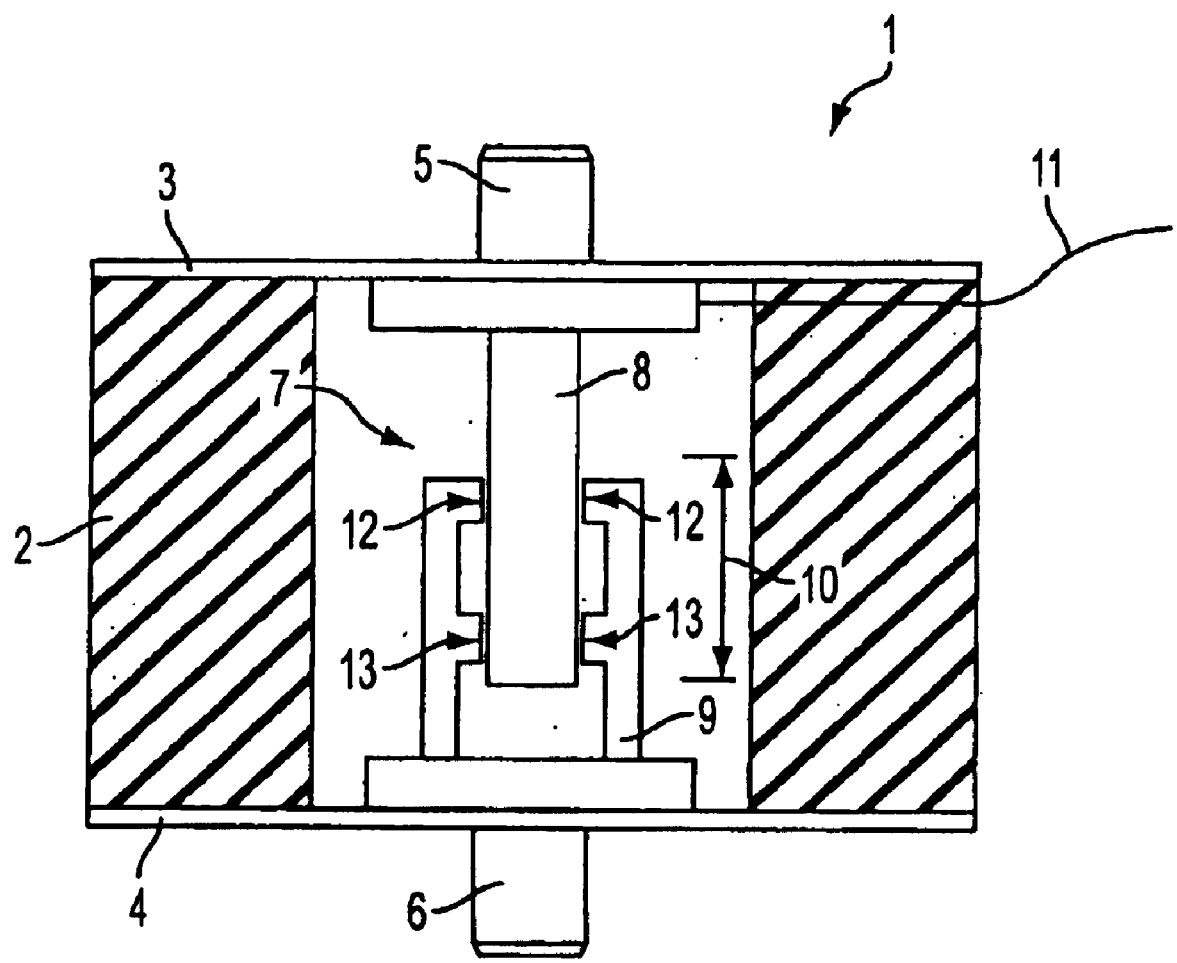

ELASTOMER BEARING

CROSS-REFERENCE TO RELATED APPLICATIONS

The present application claims priority under 35 U.S.C. § 119 of German Patent Application No. 100 29 564.9, filed on Jun. 22, 2000.

BACKGROUND OF THE INVENTION

1. Field of the Invention

The present invention relates to an elastomer bearing for damping or decoupling vibrations between neighboring components. The elastomer bearing includes a spring body made of an elastomer material, e.g., rubber, that is connected on at least one of its two face ends to a connection part, e.g., a metallic connection part, for fastening.

2. Discussion of Background Information

Such spring elements, which can be constructed in a relatively simple manner, are used, for fastening components or aggregates in a vibration-isolating manner in order to protect them from damaging vibrations or shocks or to prevent vibrations originating there from being transferred to other components. The fastening of such spring elements always occurs by screw connections, with the connection parts of the spring element either having an inner thread formed inside them or attached to them in the form of nuts or carrying stud bolts with an outer thread.

Rubber-metal spring elements whose rubber bodies can have hollow spaces for influencing their stiffness and in which the connection elements are provided with bores for attaching separate screws are known, for example, from German Gebrauchsmuster No. 19 01 501.

Hydraulically damped bearings are known, for example, from German Patent No. 34 41 592 C2, in which, in addition to the damping of vibrations by rubber elements, a hydraulic fluid is also used to damp such that, when the bearing is loaded, the fluid flows through particular throttle cross-sections. Using this construction, the bearing can often be configured to various frequency ranges.

One disadvantage of all of these bearings is that the ability to switch and the ability to adjust or regulate with regard to the damping rate or force and to different vibration frequencies cannot be achieved at all or can only be achieved with a very high expense.

SUMMARY OF THE INVENTION

The instant invention substantially prevents the disadvantages that have been known up to now and provides an adjustable or regulatable elastomer bearing that is simple and cost-effective to produce but which can be regulated precisely and with simple devices.

Therefore, in accordance with the features of the instant invention, the elastomer bearing includes a frictional damper that is connected in a parallel manner and may be regulated electrically and/or electronically.

Accordingly, the elastomer bearing has an electrically and/or electronically regulatable frictional damper. Advantageously, the spring body is constructed in the form of a hollow cylinder and has on both of its face ends metallic connection parts in the shape of discs which essentially close the hollow space. The regulatable frictional damper is then arranged in the interior of the hollow space and connected to both connection parts.

Advantageously, the regulatable frictional damper includes at least two damper elements, each fastened on a connection part and protruding into the hollow space, that are adjacent by way of a partial region and rest against one another in such a way that they are displaceable in the force transfer direction. A frictional pairing may then be activated by applying electrical energy between the damper elements.

A particularly advantageous manner of activating the frictional pairing includes that at least one of the damper elements, which is attached to a connection part and protrudes into the hollow space, has a piezo-electrically active surface at least in a partial region adjacent to the other damper element. When energy is applied, the piezo-electrically active surface deforms in the direction of the surface of the other damper element, whereby the surfaces come into frictional contact with each other. Further, the strength of the frictional force is easy to regulate using the amount of piezo-electric deformation and, therefore, the energy supply. Especially with such a construction, it is advantageous for the damper elements to be constructed as cylinders and hollow cylinders that can be moved one into the other, and for the partial regions of the damping element to be formed as a cylinder that is insertable into the other damping element formed as a hollow cylinder. In this regard, the partial region can include, e.g., the piezo-electrically active surface. If the corresponding cylinder region then "thickens" after the supply of energy, the frictional pairing comes into effect.

Another advantageous construction includes that at least one of the damper elements, each of which is attached to a connection part and protrudes into the hollow space, have at least one electromagnet at least in the region adjacent to the other damper element and the other damper element which protrudes into the hollow space is formed as a metallic anchor in its adjacent partial region. By applying electrical energy, it is possible to activate a frictional pairing between the electromagnet and the anchor. The intensity of the frictional force can be easily regulated using the energy supply in such a construction as well.

In another advantageous construction, the regulatable damper elements can also include elastomeric material, with at least one element having piezo-ceramic components or embedded piezo crystals in its partial region adjacent to the other damper element, which deforms the surface to such an extent that a frictional pairing occurs.

Another advantageous construction includes the damper elements constructed as adjacent plates and, optionally, being additionally supported during their relative movement in the frictional pairing by guide devices such that the normal forces acting on the surfaces can be easily absorbed.

The instant invention is directed to a bearing for damping or decoupling vibrations between adjacent components. The bearing includes a spring body having face ends, a connection part coupled to at least one of the face ends, and a frictional damper coupled in a parallel manner with the spring body. The frictional damper is at least one of electrically and electronically regulatable.

In accordance with a feature of the present invention, the spring body may include an elastomeric material. Further, the elastomer material may include rubber.

According to another feature of the instant invention, the connection part can include a metallic connection part.

Moreover, the spring body can include a hollow cylinder. Disc-shaped connecting parts can be coupled to each of the face ends, thereby essentially closing a hollow space within the hollow cylinder, and the frictional damper may be arranged within the hollow space and can be coupled to connected to the disc-shaped connecting parts. The disc-shaped elastomer connecting part may include metallic connecting parts. Further, the frictional damper can include at least two damping elements, which are coupled to the disc-shaped connecting parts and which may be arranged to protrude into the hollow space. A partial region of one of the at least two damping elements may be displaceably positioned against another of the at least two damping elements. The at least two damping elements can be displaceable in a force transfer direction. A frictional pairing can be activated by applying electrical energy between the at least two damping elements. Each of the at least two damping elements can be fastened to a connecting part and can be arranged to protrude into the hollow space. At least one of the at least two damping elements can have a partial region including a piezo-electrically active surface positioned adjacent to another of the at least two damping elements. The piezo-electric active surface may be deformable in a direction of a surface of the another damping element by an application of electrical energy, thereby activating a frictional pairing. At least one of the at least two damping elements may include an elastomeric material and the partial region of the one damping element can include one of piezo-ceramic components or embedded piezo crystals, which are adapted to deform the piezo-electric active surface to form the frictional pairing. Each of the at least two damping elements can be fastened to a connecting part and may be arranged to protrude into the hollow space. At least one of the at least two damping elements may have a partial region may include at least one electromagnet and another of the at least two damping elements can include a metallic anchor, such that, by applying electrical energy, the at least one electromagnet and the metallic anchor form a frictional pairing. Still further, guidance devices may be arranged to support the at least two damping elements during their relative movement in a frictional pairing. The at least two damping elements may be comprised of cylinders and hollow cylinders that are insertable one into the other. Further still, the at least two damping elements can include adjacent plates.

The present invention is directed to an elastomer bearing for damping or decoupling vibrations between adjacent components. The elastomer bearing includes a cylindrical spring body including an elastomer material and having face ends, a connection part coupled to at least one of the face ends, and a frictional damper located within the cylindrical spring body and coupled in a parallel manner with the cylindrical spring body. The frictional damper is at least one of electrically and electronically regulatable.

According to a feature of the instant invention, the frictional damper may include at least two damper elements which are arranged for movement relative to each other. The at least two damper elements can include a cylinder and a hollow cylinder arranged for sliding engagement. One of the at least two damper elements may include a partial region arranged adjacent to another of the at least two damper elements to form a selectively frictional pairing. The partial region can include a piezo-electrically active surface which is selectively deformable by applying electrical energy. The piezo-electrically active surface can include at least one of piezo-ceramic components and embedded piezo crystals. Further, the partial region may include an electromagnet and the another damper element may include a metallic anchor.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted drawing by way of a non-limiting example of an exemplary embodiment of the present invention, and wherein:

The FIGURE illustrates an elastomer bearing in accordance with the features of the instant invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The Figure illustrates an elastomer bearing 1 with a spring body 2 made of, e.g., rubber. Spring body 2 can be formed as a hollow cylinder which is connected on both of its face ends to metallic plates 3 and 4. In this manner, the hollow space within the hollow cylinder is essentially closed.

The fastening of the elastomer bearing occurs by threaded connections, with connecting parts carrying stud bolts 5 and 6 having an outer thread.

Regulatable frictional damper 7 includes two damper elements 8 and 9, which are each fastened to a connecting part and arranged to protrude into the hollow space. Damper elements 8 and 9 are formed, e.g., as a cylinder and a hollow cylinder that can be moved one into the other.

A partial region 10 of damper element 8 can be formed, e.g., as a cylinder, and can be insertable into damper element 9, which is formed as a hollow cylinder. Partial region 10 can include, e.g., a piezo-electrically active surface. The piezo-electrically active surface may include at least one of piezo-ceramic components and/or embedded piezo crystals. In this way, if partial region 10 "thickens" after the supply of energy from energy supply 11, a frictional pairing between damping elements 8 and 9 on frictional surfaces 12 and 13 comes into effect.

Moreover, partial region 10 can include, e.g., an electromagnet, and damper element 9 can be formed, e.g., as a metallic anchor. In this way, if the electromagnet is activated by the supply of energy from energy supply 11, a frictional pairing occurs between damper elements 8 and 9.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A bearing for damping or decoupling vibrations between adjacent components, said bearing comprising:
    a spring body having face ends and a hollow space;
    a connection part coupled to at least one of said face ends; and
    a frictional damper coupled in a parallel manner with said spring body,
    wherein said frictional damper is at least one of electrically and electronically regulatable,
    wherein said frictional damper comprises at least two damping elements, at least one of the at least two damping elements being coupled to said connecting part and each of the at least two damping elements being arranged to protrude into said hollow space, and
    wherein the at least two damping elements frictionally engage each other, wherein the friction engagement is regulatable by applying electrical energy, and wherein the frictional engagement occurs between a piezo-electrically active surface.

2. The bearing in accordance with claim 1, wherein a partial region of one of said at least two damping elements is displaceably positioned against another of said at least two damping elements, wherein said at least two damping elements are displaceable in a force transfer direction.

3. The bearing in accordance with claim 1, wherein each of said at least two damping elements is fastened to a connecting part and is arranged to protrude into said hollow space, and
    wherein at least one of said at least two damping elements has a partial region comprising at least one electromagnet and another of said at least two damping elements comprises a metallic anchor, such that, by applying electrical energy, said at least one electromagnet and said metallic anchor form a frictional pairing.

4. The bearing in accordance with claim 1, further comprising guidance devices arranged to support said at least two damping elements during their relative movement in frictional engagement.

5. The bearing in accordance with claim 1, wherein said at least two damping elements are comprised of cylinders and hollow cylinders that are insertable one into the other.

6. A bearing for damping or decoupling vibrations between adjacent components, said bearing comprising:
    a spring body having face ends and a hollow space;
    a connection part coupled to at least one of said face ends; and
    a frictional damper coupled in a parallel manner with said spring body,
    wherein said frictional damper is at least one of electrically and electronically regulatable,
    wherein said frictional damper comprises at least two damping elements, at least one of the at least two damping elements being coupled to said connecting part and each of the at least two damping elements being arranged to protrude into said hollow space,
    wherein each of said at least two damping elements is fastened to a connecting part and is arranged to protrude into said hollow space, and
    wherein at least one of said at least two damping elements has a partial region comprising a piezo-electrically active surface positioned adjacent to another of said at least two damping elements, said piezo-electric active surface being deformable in a direction of a surface of said another damping element by an application of electrical energy, thereby activating a frictional pairing.

7. The bearing in accordance with claim 6, wherein at least one of said at least two damping elements comprises an elastomeric material and wherein said partial region of said one damping element comprises one of piezo-ceramic components or embedded piezo crystals, which are adapted to deform said piezo-electric active surface to form said frictional pairing.

8. A elastomer bearing for damping or decoupling vibrations between adjacent components comprising:
    a cylindrical spring body comprising an elastomer material and having face ends;
    a connection part coupled to at least one of said face ends; and
    a frictional damper located within said cylindrical spring body and coupled in a parallel manner with said cylindrical spring body,
    wherein said frictional damper is at least one of electrically and electronically regulatable,
    wherein said frictional damper comprises at least two damper elements which are arranged for movement relative to each other, and
    wherein the at least two damping elements frictionally engage each other, wherein the friction engagement is regulatable by applying electrical energy, and wherein the frictional engagement occurs between a piezo-electrically active surface.

9. The elastomer bearing in accordance with claim 8, wherein said at least two damper elements comprise a cylinder and a hollow cylinder arranged for sliding engagement.

10. The elastomer bearing in accordance with claim 8, wherein one of said at least two damper elements comprises an electromagnet and another of said at least two damper elements comprises a metallic anchor.

11. An elastomer bearing for damping or decoupling vibrations between adjacent components comprising:
    a cylindrical spring body comprising an elastomeric material and having face ends;
    a connection part coupled to at least one of said face ends; and
    a frictional damper located within said cylindrical spring body and coupled in a parallel manner with said cylindrical spring body,
    wherein said frictional damper is at least one of electrically and electronically regulatable,
    wherein said frictional damper comprises at least two damper elements which are arranged for movement relative to each other, and
    wherein one of said at least two damper elements comprise comprises a partial region arranged adjacent to another of said at least two damper elements to form a selectively frictional pairing.

12. The elastomer bearing in accordance with claim 11, wherein said partial region comprises a piezo-electrically active surface which is selectively deformable by applying electrical energy.

13. The elastomer bearing in accordance with claim 12, wherein said piezo-electrically active surface comprises at least one of piezo-ceramic components and embedded piezo crystals.

* * * * *